United States Patent
Dash et al.

(10) Patent No.: US 9,692,296 B1
(45) Date of Patent: Jun. 27, 2017

(54) SINGLE-INPUT-MULTIPLE-OUTPUT (SIMO) DC-DC CONVERTERS AND SIMO DC-DC CONVERTER CONTROL CIRCUITS

(71) Applicant: Texas Instruments Incorporated, Dallas, TX (US)

(72) Inventors: Ranjit Kumar Dash, Bangalore (IN); Keith Edmund Kunz, Bryan, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/043,255

(22) Filed: Feb. 12, 2016

(51) Int. Cl.
*H02M 3/158* (2006.01)
*H02M 3/04* (2006.01)
(Continued)

(52) U.S. Cl.
CPC ............. *H02M 3/04* (2013.01); *H02M 3/156* (2013.01); *H02M 3/158* (2013.01); *H02M 3/1588* (2013.01); *H02M 2001/009* (2013.01)

(58) Field of Classification Search
CPC .... H02M 3/156; H02M 3/158; H02M 3/1588; H02M 2001/009
See application file for complete search history.

(56) References Cited

U.S. PATENT DOCUMENTS

| | | | |
|---|---|---|---|
| 2011/0043181 A1* | 2/2011 | Jing | H02M 3/158 323/288 |
| 2011/0169468 A1* | 7/2011 | Wu | H02M 3/157 323/282 |

(Continued)

OTHER PUBLICATIONS

M. Jabbari Farzanehfard, "Family of soft switching resonant DC-DC converters," The Institution of Engineering and Technology, www.ietdl.org, Published in IET Power Electronics, IET Power Electron., Mar. 2009, vol. 2, Iss. 2, pp. 113-124, 13 pages.

(Continued)

*Primary Examiner* — Matthew Nguyen
*Assistant Examiner* — Ishrat Jamali
(74) *Attorney, Agent, or Firm* — John R. Pessetto; Charles A. Brill; Frank D. Cimino

(57) ABSTRACT

Single-input-multiple-output (SIMO) DC-DC converters and SIMO DC-DC converter control circuits are disclosed. An example DC-DC converter control circuit includes a switch controller to control respective switches of a SIMO DC-DC voltage converter that has multiple output circuits. The example control circuit also includes an arbitration circuit that determines a first one of the output circuits to have priority over other ones of the output circuits based on a priority signal, and selects a first output circuit to be charged during a first time slot based on the priority signal and based on first kick signals indicating that the at least two output circuits are to be charged. The control circuit also includes a next kick detector that determines a second one of the output circuits to be charged during a second time slot after the first time slot based on the priority. The control circuit also includes a time slot controller that determines a first time duration of the first time slot based on the determined second one of the output circuits, the arbitration circuit to output a second kick signal to the switch controller to control the switches to charge the first one of the output circuits during the first time slot.

19 Claims, 11 Drawing Sheets

(51) Int. Cl.
*H02M 3/156* (2006.01)
*H02M 1/00* (2006.01)

(56) References Cited

U.S. PATENT DOCUMENTS

| | | | |
|---|---|---|---|
| 2013/0229058 A1* | 9/2013 | Chen | H02J 1/00 |
| | | | 307/31 |
| 2014/0232359 A1 | 8/2014 | Dash et al. | |
| 2014/0285014 A1* | 9/2014 | Calhoun | H02M 3/158 |
| | | | 307/31 |

OTHER PUBLICATIONS

Shahalami et al., "Simulation and Implementation of a New Topology in Multi-Output DC-DC Resonant Converters Based on SwRC Converters," Feb. 16-17, 2011, 2nd Power Electronics, Drive Systems and Technologies Conference, 7 pages.

Kuan et al., "Near-Independently Regulated 5-Output Single-Inductor DC-DC Buck Converter Delivering 1.2W/mm2 in 65nm CMOS," ISSCC, Feb. 19-23, 2012, Session 16, Switching Power Control Techniques, 16.1, 3 pages.

* cited by examiner

US 9,692,296 B1

SINGLE-INPUT-MULTIPLE-OUTPUT (SIMO) DC-DC CONVERTERS AND SIMO DC-DC CONVERTER CONTROL CIRCUITS

FIELD OF THE DISCLOSURE

This disclosure relates generally to voltage conversion circuits, and, more particularly, to single-input-multiple-output (SIMO) DC-DC converters and SIMO DC-DC converter control circuits.

BACKGROUND

The advent of large, powerful computing devices on a single integrated circuit chip and the need to reduce their power consumption (e.g., in mobile devices) has led to the need for multiple on-chip power sources to provide a range of relatively high power supply voltages to various faster, higher-performance portions of the chip and a range of relatively low power supply voltages to various slower, lower performance portions of the chip. For example, circuitry in one part of the chip may need to operate very fast, and this may be accomplished by increasing the power supply voltage for that part of the chip while the power supply voltage(s) are much lower on slower parts of the chip. Unfortunately, adding a large number of DC-DC converters to provide different power supply voltages in various parts of the chip usually is not practical because that has required adding a corresponding number of external inductors and capacitors and associated package leads, which is very costly.

SUMMARY

Disclosed example DC-DC voltage converter control circuits include a switch controller to control respective switches of a SIMO DC-DC voltage converter having a plurality of output circuits. Some examples further include an arbitration circuit. In some examples, the arbitration circuit determines a first one of the output circuits to have priority over other ones of the output circuits based on a priority signal and selects a first one of the at least two of the output circuits to be charged during a first time slot based on the priority signal and based on first kick signals indicating that the at least two output circuits are to be charged. Some examples further include a next kick detector to determine a second one of the output circuits to be charged during a second time slot after the first time slot based on the priority. Some examples further include a time slot controller to determine a first time duration of the first time slot based on the determined second one of the output circuits. In some examples, the arbitration circuit outputs a second kick signal to the switch controller to control the switches to charge the first one of the output circuits during the first time slot.

Disclosed example DC-DC voltage converters include an inductor having a first terminal directly coupled to a source of a DC input voltage and a second terminal coupled to a resonance conductor. Some example voltage converters further include a resonance capacitor having a first terminal coupled to the resonance conductor. Some examples include a first switch coupled between the resonance conductor and a first output conductor for a first output voltage, where the first switch selectively conducts inductor current to the first output conductor during a first resonator phase of a first resonator cycle. Some examples further include a second switch coupled between a second terminal of the resonance capacitor and the first output conductor, where the second switch selectively conducts the inductor current through the resonance capacitor into the first output conductor during a second resonator phase of the first resonator cycle. Some examples further include a third switch coupled between the resonance conductor and a second output conductor for a second output voltage, where the third switch selectively conducts the inductor current to the second output conductor during the first resonator phase of a second resonator cycle. Some examples further include a fourth switch coupled between the second terminal of the resonance capacitor and the second output conductor, where the fourth switch selectively conducts the inductor current through the resonance capacitor into the first output conductor during a second resonator phase of the second resonator cycle. Some examples further include a fifth switch coupled between the second terminal of the resonance capacitor and a first reference voltage for conducting the inductor current from a source of the first reference voltage through the resonance capacitor into the source of the DC input voltage during a third phase of the first resonator cycle and a third phase of the second resonator cycle. Some examples further include a switch controller coupled to the first, second, third, fourth, and fifth switches to control the first, second, third, fourth, and fifth switches. Some examples further include an arbitration circuit coupled to the switch controller. In some examples, the arbitration circuit determines a first one of the output voltages to have priority over other ones of the output voltages based on a priority signal, and selects a first one of the at least two of the output voltages to be charged during a first time slot based on the priority signal and based on first kick signals indicating that the at least two output voltages are to be charged. Some examples further include a next kick detector coupled to the arbitration circuit to determine a second one of the output voltages to be charged during a second time slot after the first time slot based on the priority. Some examples further include a time slot controller coupled to the next kick detector, the arbitration circuit, and the switch controller. In some examples, the time slot controller determines a first time duration of the first time slot based on the determined second one of the output voltages, the arbitration circuit to output a second kick signal to the switch controller to control the first, second, and fifth switches to charge the first one of the output voltages during the first time slot.

Disclosed example DC-DC voltage converters include an inductor, which has a first terminal coupled to a source of a DC input voltage via a first switch. In some examples, the inductor is connected to a first reference voltage via a second switch and has a second terminal coupled to a resonance conductor. Some examples further include a third switch coupled between the resonance conductor and a first output conductor for a first output voltage, where the third switch selectively conducts an inductor current to the first output conductor. Some examples further include a fourth switch coupled between the resonance conductor and a second output conductor for a second output voltage, where the fourth switch selectively conducts the inductor current to the second output conductor. Some examples further include an arbitration circuit to determine one of the first output voltage or the second output voltage to have priority over the other of the first output voltage or the second output voltage based on a priority signal. In some examples, the arbitration circuit selects the determined one of the first output voltage or the second output voltage to be charged during a first number of time slots based on the priority signal. In some examples, the first number of time slots is larger than a second number of time slots assigned to the other one of the first output voltage or the second output voltage. Some examples further include a switch controller to control the first, second, third, and fourth switches to charge the determined one of the first output voltage or the second output voltage during the first number of time slots. In some examples, the switch controller controls the first, second, third, and fourth switches to charge the other one of the first output voltage or the second output voltage during the second number of time slots.

BRIEF DESCRIPTION OF THE DRAWINGS

The figures are not to scale. Wherever appropriate, the same reference numbers will be used throughout the drawing(s) and accompanying written description to refer to the same or like parts.

DETAILED DESCRIPTION

Figure 1:
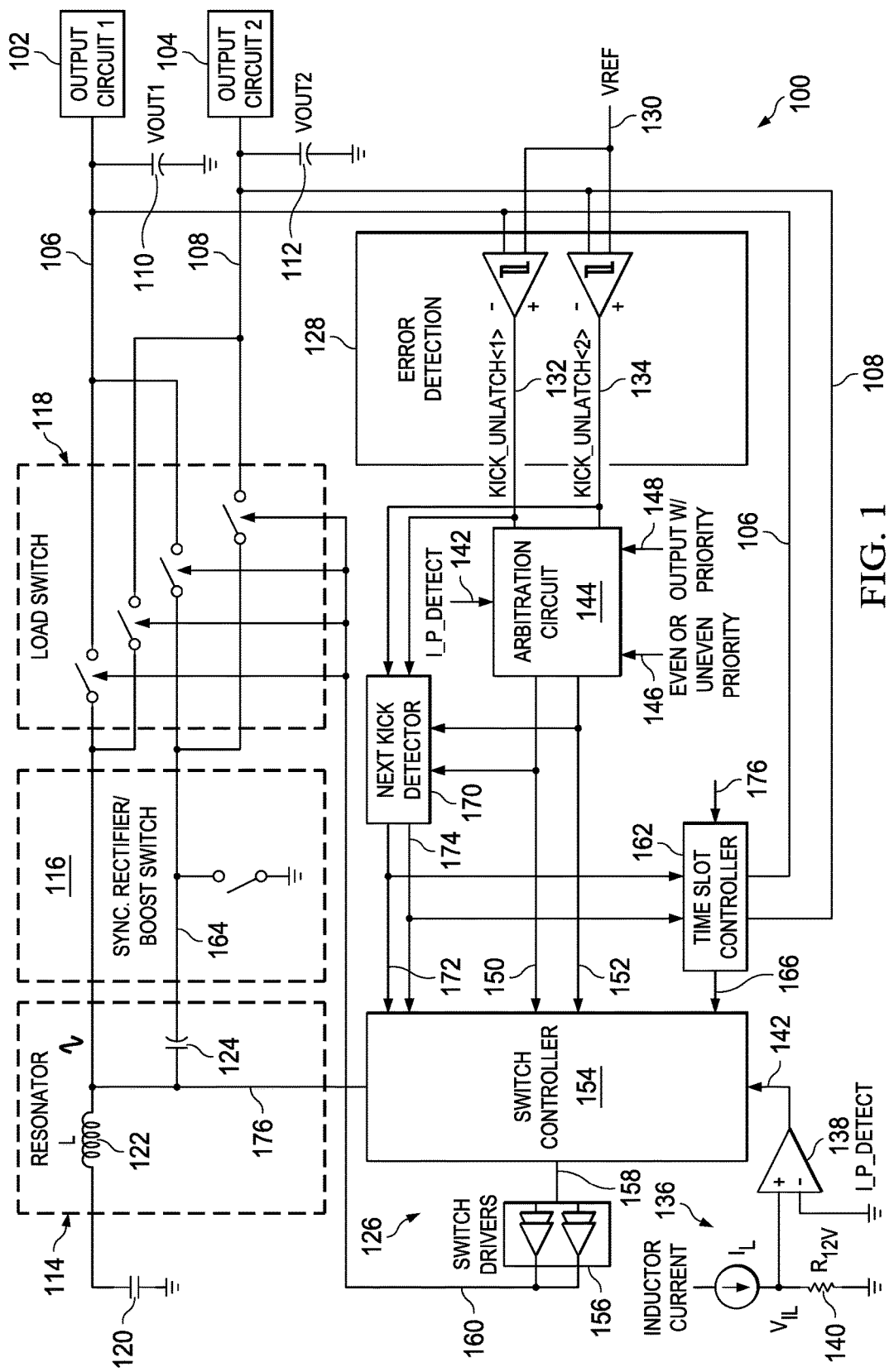
FIG. 1 is a schematic diagram of an example arbitrated-output resonant single-input-multiple-output DC-DC converter constructed in accordance with the teachings of this disclosure to charge multiple output circuits having different priorities.

Single-Input-Multiple-Output (SIMO) DC-DC converters require only one external inductor and can provide multiple individually controllable power supply voltages by sharing the single inductor. For example, the single inductor may be time-shared by each of multiple output circuits or voltages. Typical drawbacks to conventional SIMO DC-DC converters include relatively low power efficiency and/or increased ripple voltages than using an equivalent number of Single-Input-Single-Output (SISO) DC-DC converters.

Disclosed examples provide a user defined weighting and arbitration between multiple outputs for classical SIMO DC-DC voltage converters and/or resonant based SIMO DC-DC voltage converters to provide improved and/or customizable ripple performance for SIMO DC-DC voltage converters. In some examples, an arbitration circuit receives one or more input signals to enable user programmability of the relative priorities of the output voltages. The priority input signals permit designers or users of the example DC-DC converters to configure the preferred inductor charge sharing scheme for the particular outputs of an application or device. Some disclosed examples provide improved power efficiency by controlling the SIMO DC-DC converter to switch between resonator phases at times that are based on the output charging order to achieve substantially or approximately zero voltage switching (e.g., switching when the voltage difference across a resonator capacitor is less than 100 millivolts (mV)).

Disclosed examples of resonant-based DC-DC converters use a clock signal that is derived from either a zero-current crossing point of a resonator or from a fixed time period. In some examples, the clock is divided by a multiple factor "n" of the number of the output voltages supported by the DC-DC converter. For example, for 4 output voltages, the clock signal is divided by a factor of 4*n, and then each output is assigned one or more resulting slots of the divided clock. Therefore, there are 4*n zero-current crossing cycles (e.g., positive crossing to positive crossing or negative crossing to negative crossing), where each of the zero-current crossing cycles defines a slot.

In some examples, the arbitration circuit receives inputs to evenly arbitrate the charging of the output voltages. For example, when evenly arbitrating the charging (e.g., applying equal priorities, not applying priorities, etc.), each of the output voltages is provided an equal number of slots of the divided clock. Even arbitration may have an improved consistency of ripple performances at each of the outputs of the DC-DC converter when the outputs have similar loads.

In some examples, the arbitration circuit receives inputs to unevenly arbitrate the output signals. For example, during uneven arbitration, different ones of the output signals are assigned different (e.g., weighted) numbers of slots of the divided clock. For example, if output 1, of Outputs 1-4, is weighted higher than Outputs 2-4, then output 1 is assigned >1*n slots of the 4*n slots (e.g., more than 2 slots of 8 total slots for n=2). Uneven arbitration enables disclosed example DC-DC converters to achieve improved and/or consistent ripple performances when one or more of the outputs of the DC-DC converter has substantially different load conditions than others of the circuits. Uneven arbitration also enables the system to make trade-offs to accommodate different load types and/or different sensitivities to voltage ripples. For example, output loads that have higher sensitivities to voltage ripple can be assigned higher priorities to reduce the voltage ripple to those outputs.

Disclosed examples that use resonant-based SIMO control the duration of each time slot based on the output that is to be charged in the subsequent time slot. For example, at the beginning of each time slot, disclosed examples determine whether the next time slot is assigned to charge a different output capacitor or output voltage than the current time slot and, if so, identify which of the outputs is assigned to the next time slot. As described in more detail below, some examples control the time slot duration to achieve substantially zero voltage switching between phases of the resonator cycle. As a result of controlling the time slot duration, disclosed examples improve power efficiency and reduce undesired electromagnetic emissions.

Some disclosed examples assign a separate signal (e.g., a next arbitration signal) for each output to indicate that next assigned time slot will charge the corresponding output capacitor or output voltage. The signal is set high one cycle before the actual time slot where the output capacitor or output voltage is charged. This prepares the control loop ahead of time to select the right "duty cycle" or "on time" as the case may be, for the next output slot so that the system reaches the appropriate operating point quickly.

Disclosed examples may be modified to support any number of outputs. Additionally, if any one or outputs is enabled or disabled during runtime of the DC-DC converter, the example arbitration block and/or switching controller may make corresponding changes to begin supporting the different output configuration.

FIG. 1 is a schematic diagram of an example arbitrated-output resonant-based SIMO DC-DC converter 100 to charge multiple output circuits 102, 104 having different priorities. The example DC-DC converter 100 of FIG. 1 provides a first output voltage 106 to the example output circuit 102 and provides a second output voltage 108 to the example output circuit 104. Providing the first output voltage 106 includes charging a first output capacitor 110 and providing the second output voltage 108 includes charging a second output capacitor 112.

While two output circuits 102, 104 and two output voltages 106, 108 are shown in FIG. 1, the example DC-DC converter 100 may be modified to support any number of output circuits and corresponding output voltages. Additionally, while the output circuits 102, 104 are shown as individual circuits, either or both of the output voltages 106, 108 and the output capacitors 110, 112 may support any number of circuits having any number of functions, subject to the input power to the DC-DC converter 100.

The example DC-DC converter 100 of FIG. 1 includes a resonator 114, a rectifier switch 116 and load switches 118. The example resonator 114 is connected to an input power supply 120, and includes an inductor 122 and a resonant capacitor 124. The example DC-DC converter 100 converts the input voltage from the input power supply 120 to the output voltages 106, 108 by selectively controlling the rectifier switch 116 and the load switches 118 to cycle through different modes or phases of operation.

The example DC-DC converter 100 iterates through phases 1, 2, and 3. Phase 1 includes charging the inductor 114 and one of the output capacitors 110, 112. During phase 1, the current through the inductor 122 is positive (e.g., flowing from the inductor 122 toward the output capacitor 110, 112) and increasing during phase 1. Phase 2 includes discharging the inductor 122 and charging the output capacitor 110, 112. During phase 2, the current through the inductor 122 is positive but decreasing. Phase 3 is referred to as the "resonant mode" phase, during which the direction of the inductor current is negative (e.g., flowing from the inductor 122 to the input power supply 120). Phase 3 allows the charges associated with the resonant capacitor 124 to return to a voltage level greater than the input voltage ($V_{in}$) of the input power supply 120.

The example DC-DC converter 100 directs energy to the output circuits 102, 104 by controlling the load switches 118 via a control circuit 126. The example control circuit 126 includes an error detector 128 that receives as inputs the output voltages 106, 108 and one or more reference voltages 130. The example error detector 128 detects when one or more of the output voltages 106, 108 falls below a minimum voltage (e.g., based on the output capacitors 110, 112 discharging to provide energy to the output circuits during phase 3 of the resonance cycle). In response to detecting that one of the output voltages 106 (or 108) has fallen below the minimum voltage (e.g., the reference voltage 130), the example error detector 128 outputs an unsynchronized (or unlatched) kick signal 132 (or 134) (e.g., by outputting a logical high signal as the unsynchronized kick signal 132, 134). The example error detector 128 may output 0, 1, or more unsynchronized kick signals 132, 134 at a logical high level (e.g., logical 1). The terms "high" and "logical high" are used interchangeably throughout this document. The terms "low" and "logical low" are used interchangeably throughout this document.

The example control circuit 126 also includes a zero current crossing detector 136. The zero current crossing detector 136 includes a comparator 138 and a resistor 140. The comparator 138 has its positive (+) input connected to one terminal of the resistor 140, through which the inductor current flows to ground. The comparator 138 outputs a zero current crossing signal 142 that has a low-to-high transition whenever the current through the inductor 122 crosses through zero in a first direction and has a high-to-low transition whenever the current crosses through zero in the opposite direction. In this example, positive current refers to current flowing from the input power supply 120 to the inductor 122, and negative current refers to current flowing from the inductor 122 to the input power supply 120. An example implementation of the zero current crossing detector 136 is described in U.S. patent application Ser. No. 14/973,146, filed on Dec. 17, 2015. The entirety of U.S. patent application Ser. No. 14/973,146 is incorporated herein by reference.

The example control circuit 126 further includes an arbitration circuit 144 that receives the unsynchronized kick signals 132, 134 and the zero current crossing signal 142 as inputs. The example arbitration circuit 144 also receives one or more priority signal(s) 146, 148 as input(s). As described in more detail below, the arbitration circuit 144 selects 0 or 1 of the output voltages 106, 108 to be charged based on the input signals, and outputs synchronized kick signals 150, 152 to identify which, if any, of the output voltages 106, 108 is to be charged.

The example priority signal 146 indicates whether one of the output circuits 102, 104 is to be given priority over the other(s) of the output circuits 102, 104 when charging, or if all output circuits 102, 104 have the same priority (or no priority). Giving one of the output circuits 102, 104 priority over the other(s) may enable a more consistent and/or reliable output voltage 106, 108 (e.g., less ripple, less likelihood of a failure in response to a rapid increase in load by the output circuit 102, 104 that has priority, etc.).

The example priority signal(s) 148 may be one or more digital signals to indicate which of two or more output voltages 106, 108 has priority over the others. For example, for two output circuits, the arbitration circuit 144 may accept a one-bit priority signal. For three or four output circuits (e.g., three or four unsynchronized kick signals input to the arbitration circuit 144), the arbitration circuit 144 may accept a two-bit priority signal. The arbitration circuit 144 may be configured for any number of priority signals 148 corresponding to any number of output voltages 106, 108. Additionally or alternatively, the arbitration circuit 144 may be configured to receive more priority signals to enable more specific assignments of output voltages to time slots.

When there are no outputs to be charged, the example arbitration circuit 144 outputs the synchronized kick signals 150, 152 to have low values (e.g., indicating that no charging is needed). When only one of the unsynchronized kick signals 132, 134 is a logical high value, the example arbitration circuit 144 outputs the synchronized kick signals 150, 152 outputs the corresponding synchronized kick signal 150, 152 at a logical high value and the other(s) of the synchronized kick signals 150, 152 at logical low value(s). When 2 or more of the unsynchronized kick signals 132, 134 have a logical high values, the example arbitration circuit 144 selects between the unsynchronized kick signals 132, 134 (e.g., based on the priority signals 146, 148) and outputs the corresponding one of the synchronized kick signals 150, 152 at a logical high value and the other(s) of the synchronized kick signals 150, 152 at logical low value(s).

The example arbitration circuit 144 outputs the synchronized (or latched) kick signals 150, 152. In the example of FIG. 1, the number of synchronized kick signals 150, 152 output by the arbitration circuit 144 is equal to the number of unsynchronized kick signals 132, 134 input to the arbitration circuit 144. An example implementation of the arbitration circuit 144 is described below with reference to FIG. 2.

The example control circuit 126 of FIG. 1 further includes a switch controller 154 and switch drivers 156. The example switch controller 154 receives the synchronized kick signals 150, 152 and the zero current crossing signal 142 as inputs, and determines which of the rectifier switch 116 and/or which of the load switches 118 are to be opened and closed at any given time. The example switch controller 154 outputs switch control signals 158 to the switch drivers 156. The number of switch control signals 158 is based on the number of output voltages 106, 108 and, thus, the number of load switches 118 in the DC-DC converter 100. The example switch drivers 156 output switch driver signals 160 to open and/or close the rectifier switch 116 and/or selected ones of the load switches 118 based on the switch control signals 158.

The example switch controller 154 may control charging of one of the output circuits 102, 104 to have a longer charge time than the other of the output circuits 102, 104. To control the charge time, the example DC-DC converter 100 includes a time slot controller 162. The example time slot controller 162 generates time slots by converting a difference between respective output voltages 106, 108 and a voltage 164 at the rectifier switch 116 to time duration values 166 (e.g., $T_{ON}$). The time duration values 166 are used to determine the time during which the load switches 118 are turned ON to increase the current through the inductor 122 (e.g., charge the inductor 122 during a linear current mode) and provide the current to the output circuit 102, 104.

The example time slot controller 162 also determines the time duration values 166 based on a prediction of the next output to be charged after the current output.

To determine the next output, example DC-DC converter 100 of FIG. 1 further includes a next kick detector 170. The example next kick detector 170 of FIG. 1 receives the unsynchronized kick signals 132, 134 as input signals, determines a output voltage 106, 108 to be charged after a current output voltage 106, 108 being charged, and outputs the next kick signals 172, 174 to the time slot controller 162 and to the switch controller 154.

To determine the next output, the example switch controller 154 of FIG. 1 controls the switch drivers 156 to open and/or close the load switches 118 to cycle through phases 1, 2, and 3 for one of the output circuits 102, 104 based on the synchronized kick signal 150, 152. The switch controller 154 of FIG. 1 controls the timing of the phases 1, 2, and 3 via the switch drivers 156 based on the time duration values 166. For example, the switch controller 154 may control the durations of the phases 1, 2, and/or 3 based on the time durations determined by the time slot controller 162.

The example switch controller 154 also receives a resonator voltage 176. As described in more detail below with reference to FIGS. 8A-8B, the example switch controller 154 measures the resonator voltage 176 (e.g., a resonator threshold voltage measurement) when the zero current crossing signal 142 changes from a negative voltage to a positive voltage. The switch controller 154 then may then use the resonator voltage 176 to control a charging time for the output voltages 106, 108.

In some examples, the arbitration circuit 144 and the switch controller 154 subdivide the time slots by assigning phase 1 of a resonator cycle to charge a first one of the output voltages 106, 108 and assigning phase 2 of the same resonator cycle to a second one of the output voltages 106, 108. For example, the switch controller 154 may control the load switches 118 to connect the first output voltage 106 to the resonator 114 during a linear current mode and connect the second output voltage 108 to the resonator 114 during a partial resonance mode.

Figure 2:
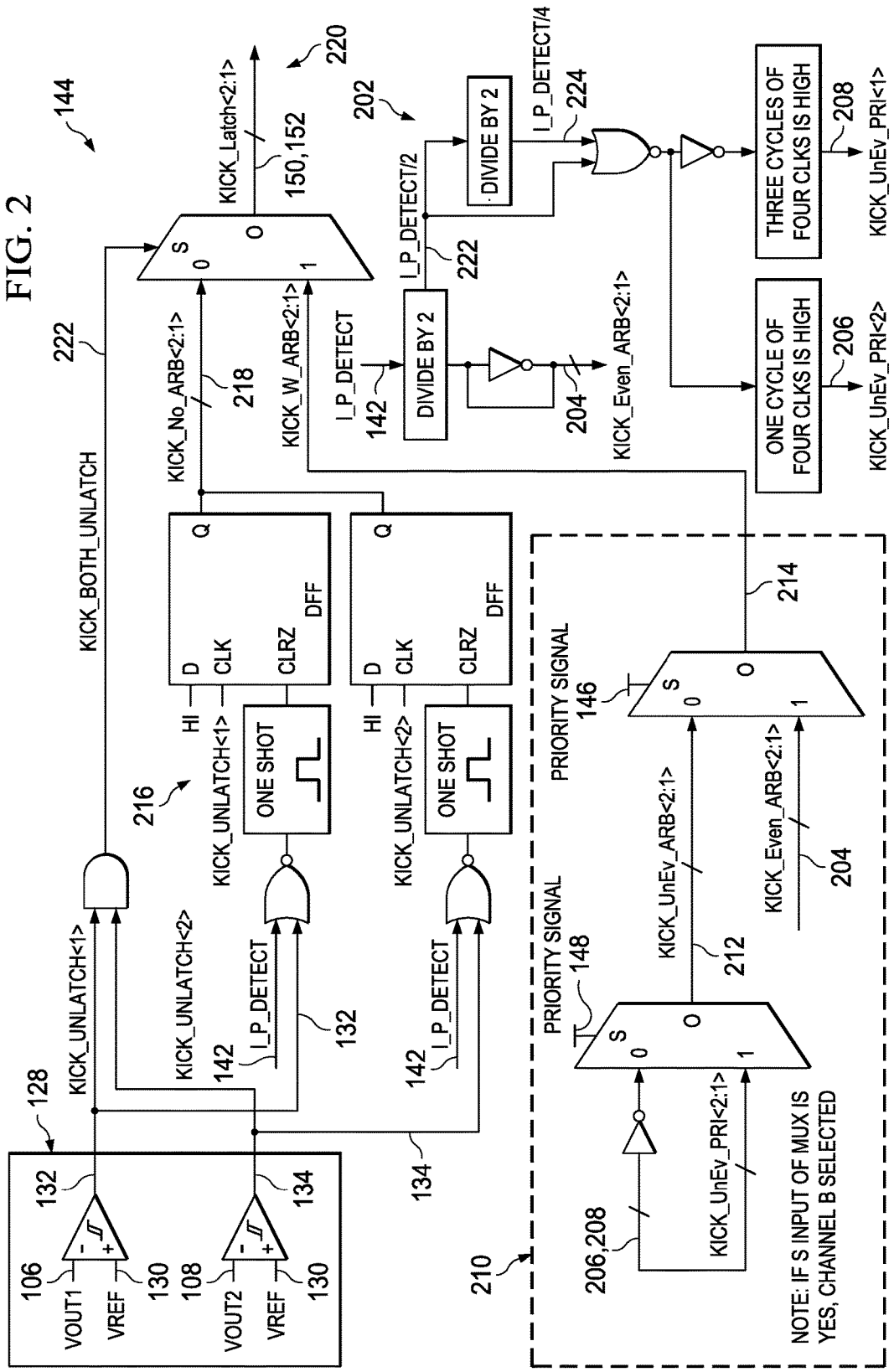
FIG. 2 is an example implementation of the arbitration circuit of FIG. 1.

FIG. 2 is an example implementation of the arbitration circuit 144 of FIG. 1. The example arbitration circuit 144 of FIG. 2 receives the unsynchronized kick signals 132, 134 from the error detector 128 of FIG. 1, receives the zero current crossing signal 142, and outputs the synchronized kick signals 150, 152. As described in more detail below, the arbitration circuit 144 calculates time slots for different arbitration scenarios, one or more of which is selected based on the priority signals 146, 148 and the unsynchronized kick signals 132, 134.

The example arbitration circuit 144 includes a clock divider 202. The clock divider 202 divides the clock signal generated from the zero current crossing signal 142 to generate even arbitration time slot signals 204 and uneven arbitration clock signals 206, 208. In the example of FIG. 2, there are two even arbitration time slot signals 204 corresponding to the two output voltages 106, 108 of FIG. 1, in which each of the even arbitration time slot signals 204 is high for ½ the frequency of the zero current crossing signal 142, and the even arbitration time slot signals 204 alternate time periods in which they are logically high.

The example clock divider 202 generates the uneven arbitration clock signals 206, 208 to be high for different and uneven time periods. For example, for the two output voltages 106, 108 of FIG. 1, the zero current crossing signal 142 is divided by 2 and by 4 to generate 4 time slots that can be assigned to the output voltages 106, 108. A first one of the uneven arbitration clock signals 206 is generated to be high for one of the time slots (e.g., 1 zero current crossing cycle) and the other of the uneven arbitration clock signals 208 is generated to be high for three of the time slots (e.g., 3 zero current crossing cycles). As a result, one of the output voltages 106 may be charged for a longer time period that the other of the output voltages 108.

While two even arbitration time slot signals 204 and two uneven arbitration clock signals 206, 208 are illustrated in FIG. 1 for two output voltages 106, 108, the example clock divider 202 may be modified to generate any number of clock divisions and/or any division of the clock signal between two or more output voltages. In some examples, the time slots are constrained to provide at least one time slot to each of the DC-DC converter outputs.

The example arbitration circuit 144 also includes an arbitration selection circuit 210 which receives the priority signals 146, 148 as inputs. The example arbitration selection circuit 210 also receives the uneven arbitration clock signals 206, 208 as input signals. Based on the priority signal(s) 148 that indicates which of the two or more output voltages 106, 108 has priority. Based on the priority signal 148, the example arbitration selection circuit 210 determines one of the output voltages 106, 108 to have a longer charge time (e.g., corresponding to the uneven arbitration clock signals 208 that is high for a longer portion of the zero crossing current cycle) than the other of the output voltages 106, 108. The priority signal 148 indicates the one of the output voltages 106, 108 that is assigned the longer charge time and the one of the output voltages that is assigned the shorter charge time. The selected one of the output voltages 106, 108 is output as an uneven arbitration time slot signals 212.

The example arbitration selection circuit 210 further selects between the even arbitration time slot signals 204 and the uneven arbitration time slot signals 212 based on the priority signal 146. The example priority signal 146 indicates whether even or uneven arbitration is to be used to arbitrate kick signals. In combination, the priority signals 146, 148 and the arbitration selection circuit 210 provide an input to the arbitration circuit 144 to control the relative priorities of the output voltages 106, 108. The example arbitration selection circuit 210 outputs an arbitrated time slot signal 214.

In some examples, the clock divider 202 may include one or more input signals to control the ratios of the numbers of time slots between the different output voltages 106, 108 when uneven arbitration is selected.

The example arbitration circuit 144 further includes a no-arbitration selection circuit 216. The example no-arbitration selection circuit 216 receives the zero current crossing signal 142, and the unsynchronized kick signals 132, 134 as inputs. The no-arbitration selection circuit 216 generates no-arbitration time slot signals 218 as an output by synchronizing the unsynchronized kick signals 132, 134 with the zero current crossing signal 142. The example no-arbitration time slot signals 218 are equal in number to the unsynchronized kick signals 132, 134 (e.g., two no-arbitration time slot signals 218 corresponding to the two unsynchronized kick signals 132, 134).

When neither of the unsynchronized kick signals 132, 134 are high (e.g., logic high), the example no-arbitration selection circuit 216 selects the first one of the unsynchronized kick signals 132, 134 that changes from logical low to logical high and outputs the corresponding first one of the no-arbitration time slot signals 218 as high (e.g., logical high) in synchronization with the zero current crossing signal 142 going from low to high. If the second one of the unsynchronized kick signals 132, 134 changes from low to high while the first no-arbitration time slot signal 218 is high, the example no-arbitration selection circuit 216 prevents the corresponding second no-arbitration time slot signal 218 from changing from low to high in response. For example, the no-arbitration selection circuit 216 causes the second no-arbitration time slot signal 218 to wait for the next zero current crossing signal 142 to change, at which time the first no-arbitration time slot signal 218 will have changed to a low signal.

The example arbitration circuit 144 further includes an arbitration application circuit 220. The example arbitration application circuit receives an arbitration requirement signal 222 as an input signal and outputs the no-arbitration time slot signal 218 or the arbitrated time slot signal 214 as the synchronized kick signals 150, 152.

In some examples, divided clock signals 222, 224 (e.g., the zero current crossing signal 142 divided by 2 and the zero current crossing signal 142 divided by 4) are provided to the next kick detector 170 of FIG. 1 to facilitate selection of a next output to be charged in instances where more than two output circuits are to be charged.

By synchronizing the kick signals output from the arbitration circuit with the zero current crossing signal 142, the example arbitration circuit 144 reduces electromagnetic interference, reduces stress on the logic circuits, and increases power efficiency of the circuit.

Figure 3:
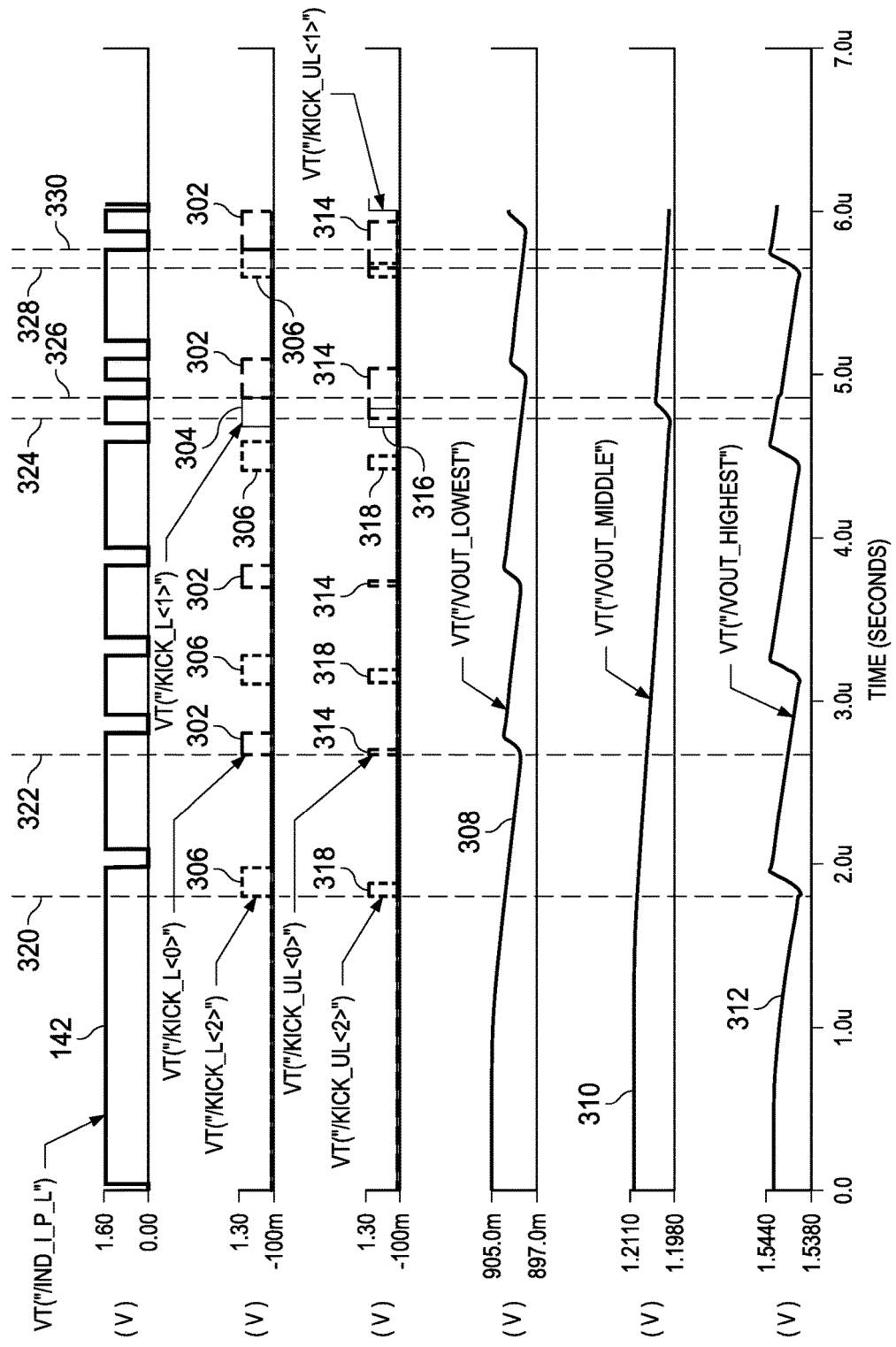
FIG. 3 illustrates example input signals to an arbitration circuit similar to the arbitration circuit of FIGS. 1 and 2.

FIGS. 1 and 2 illustrate an example using 2 output voltages 106, 108. FIGS. 3-8 are described with reference to examples in which the DC-DC converter 100 of FIG. 1 supports 3 output voltages to illustrate the time slot control. However, the examples of FIGS. 1-8 are equally FIG. 3 illustrates example input signals to an arbitration circuit similar to the arbitration circuit 144 of FIGS. 1 and 2, except that the arbitration circuit corresponds to a DC-DC converter having 3 output voltages instead of the 2 output voltages 106, 108 of FIG. 1.

FIG. 3 includes the zero current crossing signal 142 of FIGS. 1 and/or 2, synchronized kick signals 302, 304, 306 corresponding to 3 output voltages 308, 310, 312 (referred to as Vout_High, Vout_Middle, and Vout_Low, respectively). The example signals in FIG. 3 also include unsynchronized kick signals 314, 316, 318 (input to the arbitration circuit 144), that correspond to the synchronized kick signals 302, 304, 306 (output from the arbitration circuit 144), respectively. The signals 142, 302-318 of FIG. 3 are described below with reference to an example in which the priority signal 146 indicates that the arbitration circuit 144 is not to apply different priorities to the output voltages 308-312.

At a first time 320 in FIG. 3, the error detector 128 of FIGS. 1 and/or 2 detects that the output voltage signal 312 (Vout_High) has been reduced to below a threshold voltage (e.g., the reference voltage 130). In response, the error detector 128 outputs the unsynchronized kick signal 318 at a logical high value, which also causes the arbitration circuit to output the synchronized kick signal 306 at a logical high value. The switch controller 154 of FIG. 1 controls the switch drivers 156 to charge the output voltage 312 (e.g., an output capacitor connected to one or more output circuits).

Similarly, at a second time 322 in FIG. 3, the error detector 128 of FIGS. 1 and/or 2 detects that the output voltage signal 308 (Vout_Low) has been reduced to below the threshold voltage (e.g., the reference voltage 130). In response, the error detector 128 outputs the unsynchronized kick signal 314 at a logical high value, which also causes the arbitration circuit to output the synchronized kick signal 302 at a logical high value. The switch controller 154 of FIG. 1 controls the switch drivers 156 to charge the output voltage 312 (e.g., an output capacitor connected to one or more output circuits).

At times 320 and 322, only one of the three output circuits needs to be charged. As a result, no arbitration is necessary at times 320 and 322. Conversely, at time 324 of FIG. 3, while the output voltage 310 is being charged (e.g., the unsynchronized kick signal 316 and the synchronized kick signal 304 are at logical high values), the error detector 128 of FIGS. 1 and/or 2 detects that the output voltage signal 308 (Vout_Low) has been reduced to below the threshold voltage (e.g., the reference voltage 130). In response, the error detector 128 outputs the unsynchronized kick signal 314 to a logical high value while the unsynchronized kick signal 316 is also at a logical high value. However, because the synchronized kick signal 304 is already at a logical high level, the example arbitration circuit 144 does not immediately output the synchronized kick signal 302 to a logical high level. Instead, the no-arbitration selection circuit 216 causes the no-arbitration time slot signals 218 corresponding to the unsynchronized kick signal 314 and the unsynchronized kick signal 316 to change values in synchrony with the zero current crossing signal 142 having a zero current crossing event at time 326 (e.g., a change from positive current to negative current).

Similarly, at time 328, while the output voltage 312 is being charged (e.g., the unsynchronized kick signal 318 and the synchronized kick signal 306 are at logical high values), the error detector 128 of FIGS. 1 and/or 2 detects that the output voltage signal 308 (Vout_Low) has been reduced to below the threshold voltage (e.g., the reference voltage 130). In response, the error detector 128 outputs the unsynchronized kick signal 314 to a logical high value while the unsynchronized kick signal 316 is also at a logical high value. However, because the synchronized kick signal 306 is already at a logical high level, the example arbitration circuit 144 does not immediately output the synchronized kick signal 302 to a logical high level. Instead, the arbitration selection circuit 216 causes the no-arbitration time slot signals 218 corresponding to the unsynchronized kick signal 314 and the unsynchronized kick signal 318 to change values in synchrony with the zero current crossing signal 142 having a zero current crossing event at time 330 (e.g., a change from positive current to negative current).

Figure 4:
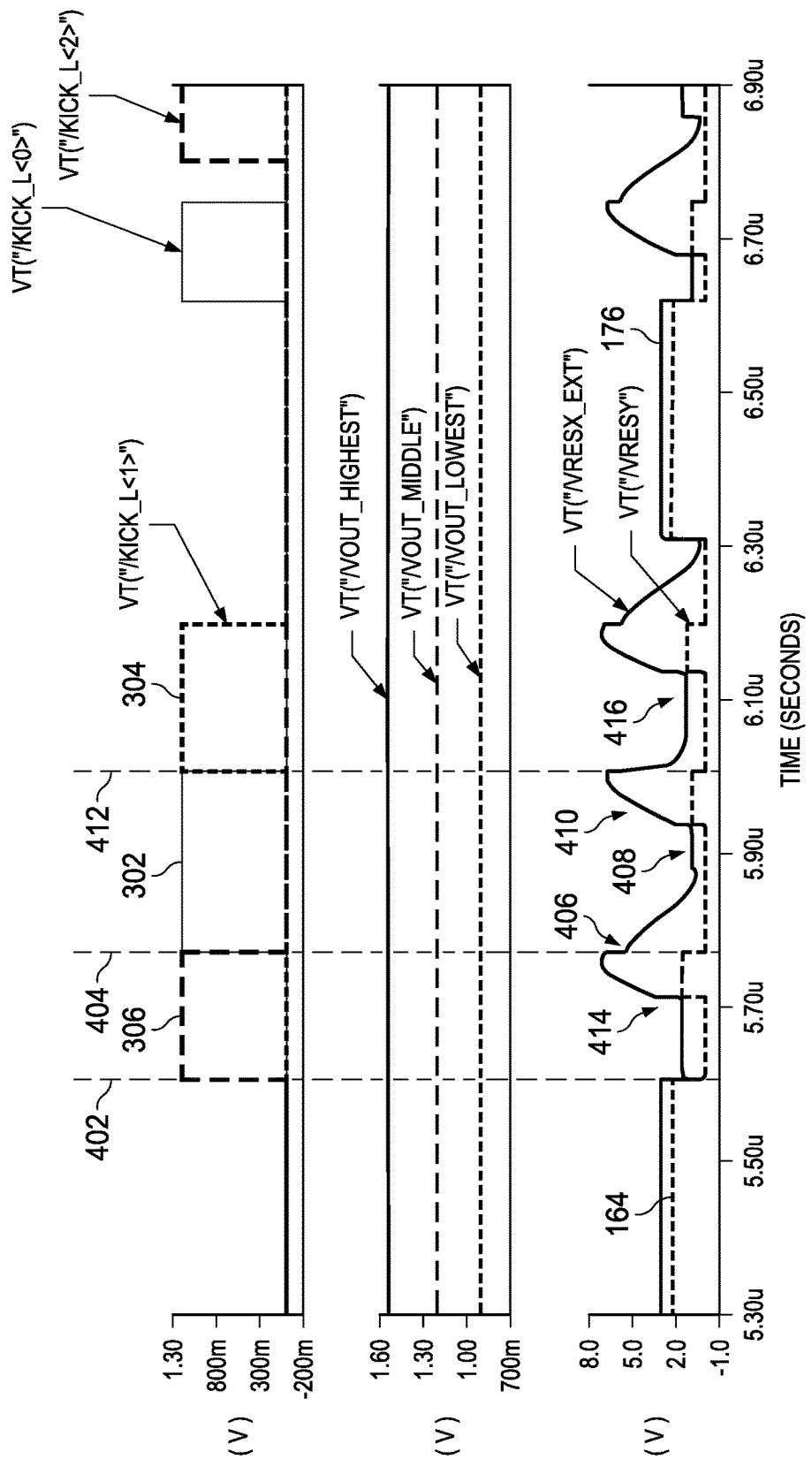
FIG. 4 illustrates example output signals of FIG. 3, the corresponding resonator voltage, and the voltage for the DC-DC converter of FIG. 1 having three different outputs.

FIG. 4 illustrates example output signals 302-306 of FIG. 3, the corresponding resonator voltage 176, and the voltage 164 for the DC-DC converter 100 of FIG. 1 having three different outputs (e.g., output voltages).

Prior to a first time 402, none of the output voltages of the DC-DC converter 100 require charging. As a result, the load switches 118 and the rectifier switch 116 hold the resonator 114 in a charged state, referred to as a dead time mode.

At the first time 402, the example arbitration circuit 144 outputs the synchronized kick signal 306 at a logical high value in response to receiving a corresponding unsynchronized kick signal at a logical high value (e.g., the unsynchronized kick signal 318 of FIG. 3). The example switch controller 154 and the switch drivers 156 control the load switches 118 and the rectifier switch 116 to go through phases 1 and 2 to charge the Vout_High output voltage 312.

At a second time 404, the arbitration circuit 144 adjusts the synchronized kick signal 306 to logical low and outputs the synchronized kick signal 302 (e.g., corresponding to the output voltage 308 of FIG. 3, or Vout_Low) at a logical high level. In response to the synchronized kick signal 302, the example switch controller 154 and the switch drivers 156 control the load switches 118 and the rectifier switch 116 to go through phase 3 406 (e.g., to recharge the capacitor 124), phase 1 408 (e.g., to direct current directly to an output capacitor corresponding to the output voltage 308), and phase 2 410 (e.g., to charge the output capacitor corresponding to the output voltage 308 via energy stored in the resonator 114) to charge the output voltage 308.

At a third time 412, the arbitration circuit 144 adjusts the synchronized kick signal 302 to logical low and outputs the synchronized kick signal 304 (e.g., corresponding to the output voltage 310 of FIG. 3, or Vout_Middle) at a logical high level. In response to the synchronized kick signal 304, the example switch controller 154 and the switch drivers 156 control the load switches 118 and the rectifier switch 116 to go through phases 1, 2, and 3 in a manner similar to the phases 406-410 discussed above.

As shown in FIG. 4, the switch controller 154 controls the load switches 118 and the rectifier switch 116 to switch from phase 1 to phase 2 when the resonator voltage 176 and the rectifier switch voltage 164 are substantially equal (e.g., zero voltage switching, such as a voltage difference of less than 100 mV). As shown in FIG. 4, the phase 1 406 is shorter than other instances 414, 416 of phase 1 in other resonator cycles. The differences in the durations of phase 1 406, 414, 416 are based on the next one of the output voltages 308, 310, 312 to be charged, as described below.

Figure 5A:
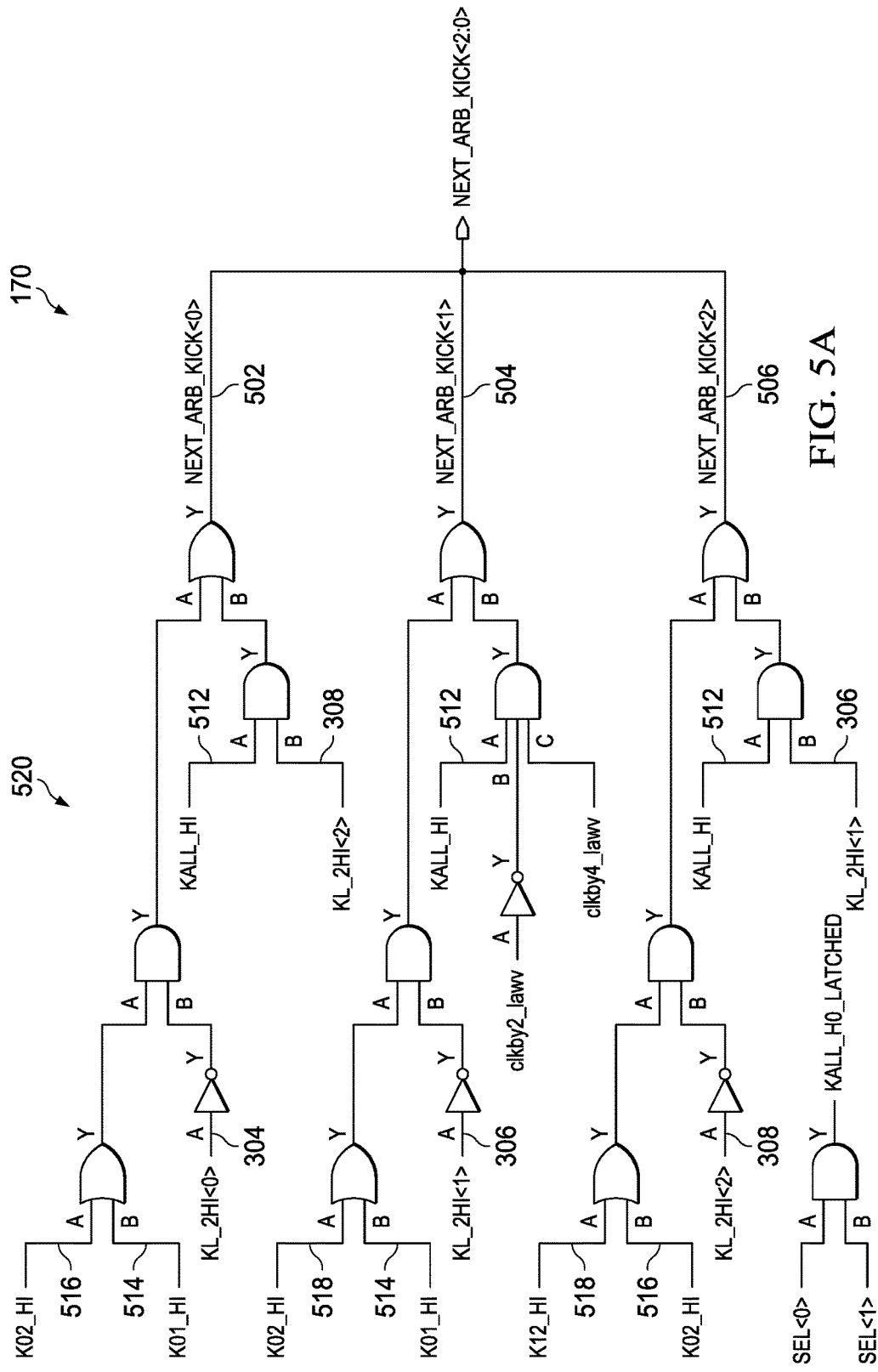
FIGS. 5A and 5B show an example implementation of the next kick detector of FIG. 1.
Figure 5B:
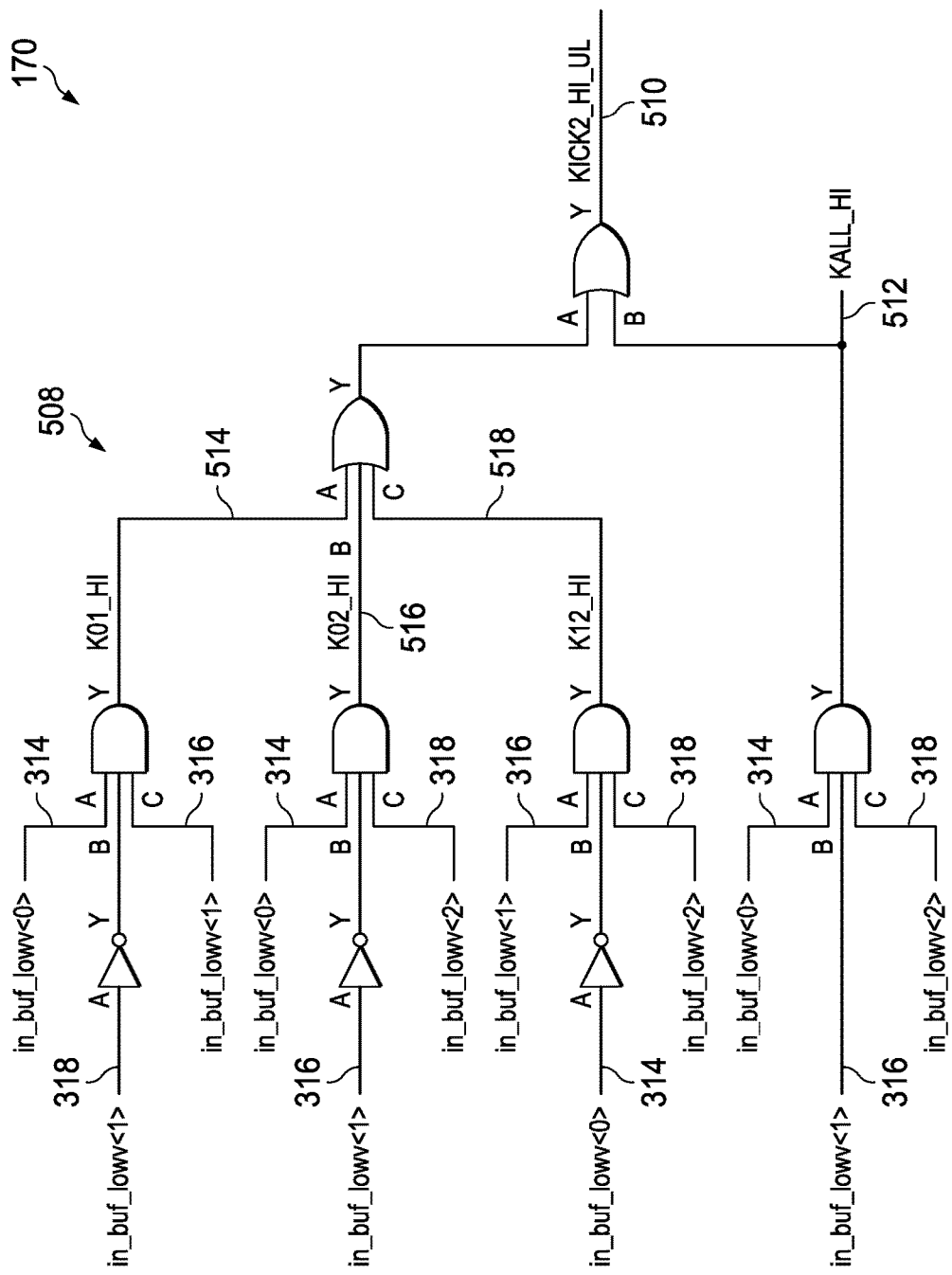

FIGS. 5A and 5B show an example implementation of the next kick detector 170 of FIG. 1. The example next kick detector 170 of FIGS. 5A and 5B detects a next output voltage, out of three output voltages supported by an example DC-DC converter, to be charged after a current output voltage being charged by the DC-DC converter. The example next kick detector 170 outputs next kick signals 502, 504, 506 corresponding to the output voltages, which are used by the switch controller 154 to determine charging time durations, as described in more detail below with respect to FIGS. 8A-8B. When the next kick signals 502, 504, 506 have a logical low value, the corresponding synchronized kick signal 302, 304, 306 is not predicted to have a logical high value before the next resonator cycle.

In the example of FIGS. 5A and 5B, the next kick detector 170 operates immediately after a zero current crossing by the inductor current, or after the arbitration circuit 144 triggers a change in the synchronized kick signals 302, 304, 306. In some examples, the next kick detector 170 operates later during a resonator cycle (e.g., during a phase 1 of the resonator cycle) if an unsynchronized kick signal 132, 134 later than the beginning of the resonator cycle. As used below, the term "current" refers to the resonator cycle (e.g., phases 1, 2, and 3) that is about to occur at the next change in the synchronized kick signals 302, 304, 306, and the term "next" refers to the resonator cycle (e.g., phases 1, 2, and 3) that is immediately subsequent to the "current" resonator cycle.

The example next kick detector 170 receives three unsynchronized kick signals (e.g., the unsynchronized kick signals 314, 316, 318 of FIG. 3) as input signals. The next kick detector 170 includes a multiple kick detector 508 to determine whether two or more of the unsynchronized kick signals 314, 316, 318 have logical high values at a given time. The multiple kick detector 508 outputs a multiple kick signal 510 that indicates whether at least two of the unsynchronized kick signals 314, 316, 318 have logical high values at a given time. The multiple kick detector 508 also outputs an all kick signal 512 that indicates that all three of the unsynchronized kick signals 314, 316, 318 have logical high values at a given time. The example multiple kick detector 508 also outputs kick identifier signals 514, 516, 518 that indicate whether each pair of the unsynchronized kick signals 314, 316, 318 have logical high values at a time.

The example next kick detector 170 includes a next kick selector 520. The next kick selector 520 receives the all kick signal 512, the kick identifier signals 514, 516, 518, and the synchronized kick signals 302, 304, 306. The next kick selector 520 determines, for each of the output voltages in the DC-DC converter (e.g., in the example of FIG. 5A, the three output voltages 308-312 of FIG. 3), whether the unsynchronized kick signals 314, 316, 318 are on at the same time and, if so, which of the output voltages 308-312 is currently being charged. Based on the output voltage currently being charged, the example next kick selector 520 chooses one of the other output voltages to be charged in the next resonator cycle.

The example next kick selector 520 outputs the next kick signals 502, 504, 506 based on which (if any) of the output voltages is to be charged at the next resonator cycle. For example, the next kick selector 520 outputs one of the next kick signals 502, 504, 506 at a logical high value if the corresponding one of the output voltages 308, 310, 312 is to be charged at the completion of the current resonator cycle, or outputs all of the next kick signals 502, 504, 506 at a logical low value if none of the output voltages 308, 310, 312 is to be charged at the completion of the current resonator cycle.

Figure 6:
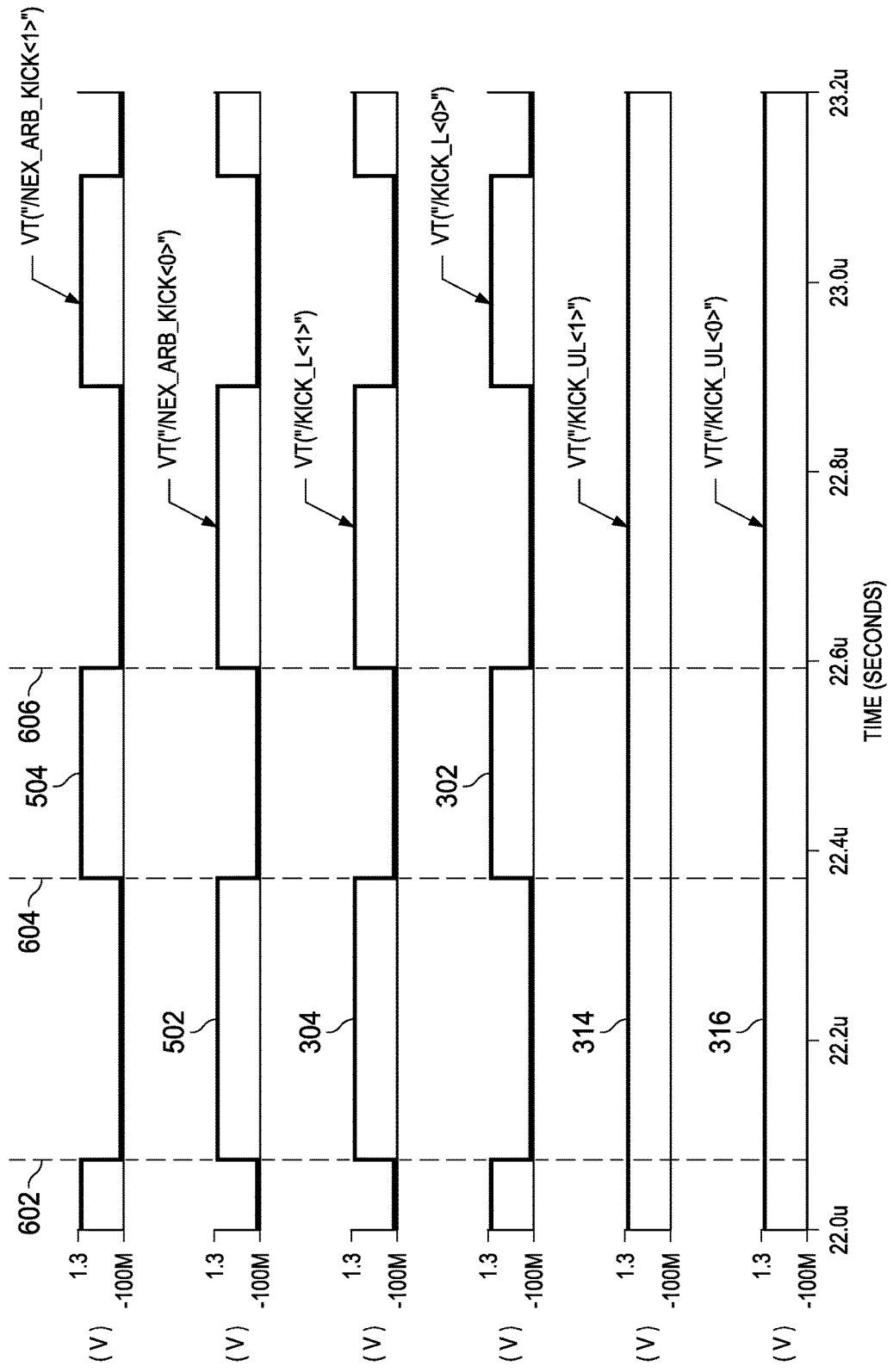
FIG. 6 illustrates examples of the unsynchronized kick signals and synchronized kick signals as inputs to the next kick detector, and corresponding next kick signals as outputs from the next kick detector of FIGS. 1 and 5.

FIG. 6 illustrates examples of the unsynchronized kick signals 314, 316 and synchronized kick signals 302, 304 as inputs to the next kick detector 170, and corresponding next kick signals 502, 504 as outputs from the next kick detector 170 of FIGS. 1 and 5.

Prior to a first time 602, the example DC-DC converter 100 is charging a first output voltage (e.g., the output voltage 106, the output circuit 102). Accordingly, the arbitration circuit 144 outputs the synchronized kick signal 302 at a logical high value and outputs the synchronized kick signal 302 at a logical low value.

At the first time 602 (e.g., at a zero current crossing of the inductor current), the example arbitration circuit 144 determines that a second output voltage is to be charged (e.g., the output voltage 108, the output circuit 104). In response, the arbitration circuit 144 changes the synchronized kick signal 302 to a logical low value and changes the synchronized kick signal 304 to a logical high value. In response to the changes in the synchronized kick signals 302, 304, the example next kick detector 170 determines a next one of the output voltages 106, 108 that is to be charged in the next resonator cycle.

The example multiple kick detector 508 of FIG. 5B determines that the unsynchronized kick signals 314, 316 are both logical high (and the unsynchronized kick signal 318 is logical low), and outputs the kick identifier signal 514 that indicates that both the unsynchronized kick signals 314, 316 are logical high. Additionally, the multiple kick detector 508 outputs the all kick signal 512 to have a logical low value, because fewer than all of the unsynchronized kick signals 314, 316, 318 have a logical high value at time 602.

Based on the value of the kick identifier signal 514 being logical high, and the values of the kick identifier signals 516, 518 and the all kick signal 512 being logical low, the example next kick selector 520 determines that the next kick signal 502 is to be set to a logical high value and the next kick signal 504 is to be set to a logical low value to indicate that the output voltage 106 is to be charged in the next resonator cycle.

In a similar manner, at time 604, the example arbitration circuit 144 determines that the first output voltage is to be charged. In response to the change in the synchronized kick signals 302, 304 at time 604, the example next kick detector 170 determines that the second output voltage is to be charged at the next resonator cycle, and adjusts the next kick signals 502, 504.

Based on the next kick signals 502, 504, the example time slot controller 162 of FIG. 1 outputs the time duration values 166 to control the duration of the current resonator cycle. As illustrated in FIG. 6, the duration of the resonator cycle that starts at time 602 and ends at time 604 is longer than the duration of the resonator cycle that starts at time 604 and ends at time 606.

As described in more detail below, the time slot controller 162 controls the durations of the resonator cycles so that zero voltage switching is achieved when switching between charging different outputs. For example, if the next output voltage is lower than the current output voltage, the time duration value 166 output by the time slot controller 162 may cause the switch controller 154 and the switch drivers 156 to control the load switches 118 and the rectifier switch 116 to create a longer resonator cycle than if the next output voltage is higher than the current output voltage. For example, in phase 3 of the resonator cycle, the voltage at the resonator 114 decreases until the switch controller 154 and the switch drivers 156 control the load switches 118 and the rectifier switch 116 to enter phase 1 or enter a dead time mode.

Figure 7:
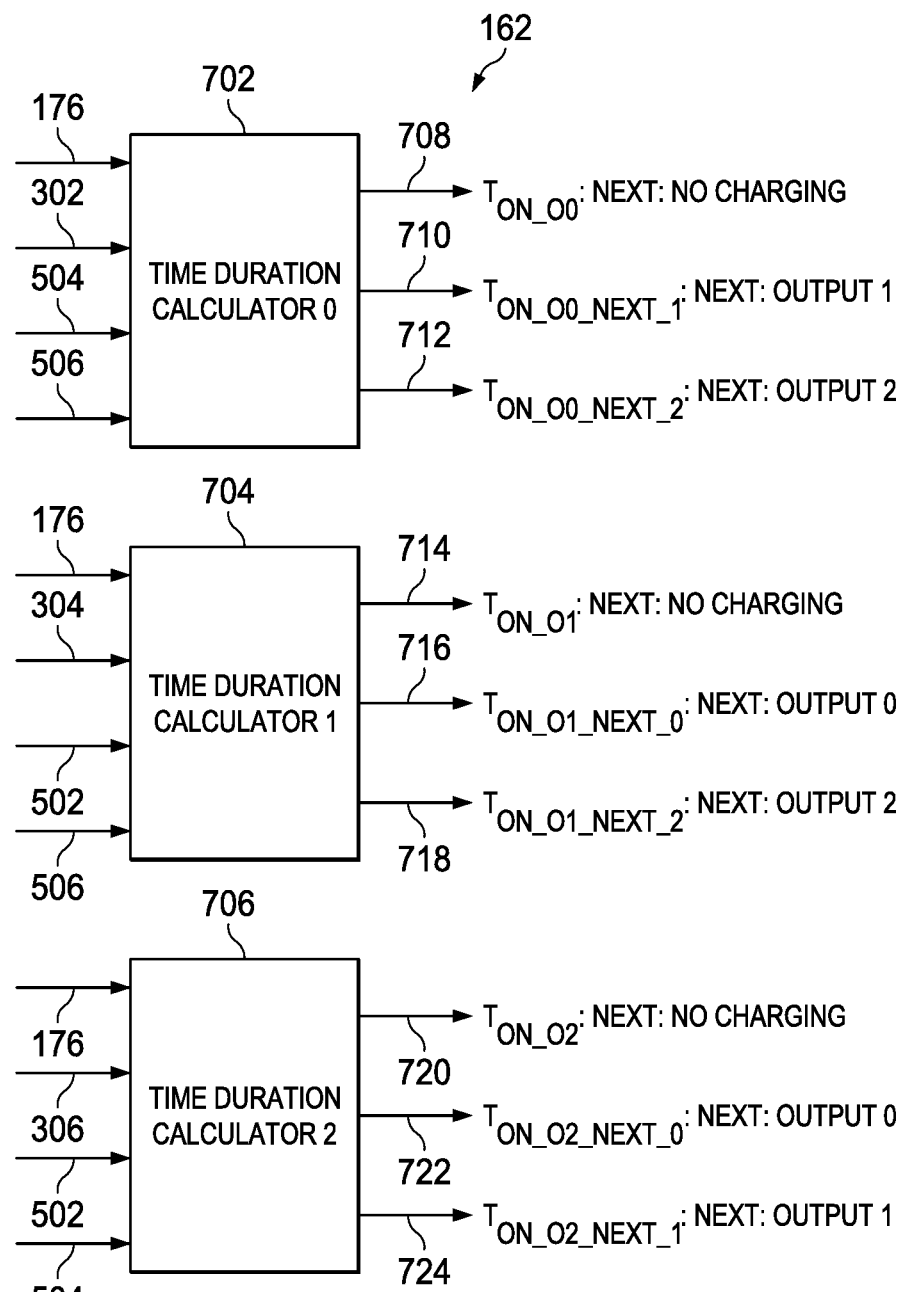
FIG. 7 is an example implementation of the time slot calculator of FIG. 1.

FIG. 7 is an example implementation of the time slot controller 162 of FIG. 1. The example time slot controller 162 of FIG. 7 includes time duration calculators 702, 704, 706 corresponding to three output voltages (e.g., the output voltages 308, 310, 312. The time slot controller 162 may have more or fewer time duration calculators that the three shown in FIG. 7, based on the number of output voltages that can be charged by the DC-DC converter 100.

The time duration calculators 702, 704, 706 may be implemented as multiplexers that select voltages based on the input signals and convert the selected voltage to a time duration. However, other implementations may additionally or alternatively be used.

The example time duration calculator 702 calculates the duration that the output voltage 308 is to be charged based on the output voltage (e.g., output 0) that is to be charged in the next resonator cycle. The time duration calculator 702 receives input signals including a measurement of the resonator voltage 176 (e.g., a resonator voltage measured when the zero current crossing signal 142 transitions from negative to positive), the synchronized kick signal 302, and the next kick signals 504, 506 corresponding to outputs 1 and 2, respectively. When the synchronized kick signal 302 is a logical high value, the example time duration calculator 702 determines a time duration for which the output voltage is to be charged based on the next kick signals 504, 506. The example time duration calculator 702 calculates and outputs time duration signals (e.g., equivalent voltage signals) for three cases: 1) a time duration signal 708 for when there is no output voltage to be charged after output 0 (e.g., dead time); 2) a time duration signal 710 for cases in which output 1 is to be charged at the next resonator cycle; and 3) a time duration signal 712 for cases in which output 2 is to be charged at the next resonator cycle. The time duration signals 708-712 (e.g., voltages) may be calibrated based on the relative output voltages of the outputs 0, 1, and 2.

Similarly, the example time duration calculator 704 calculates and outputs time duration signals 714, 716, 718 to control the resonator cycle durations when the output 1 is being charged, based on the next output to be charged. The time duration calculator 704 receives input signals including a measurement of the resonator voltage 176 (e.g., a resonator voltage measured when the zero current crossing signal 142 transitions from negative to positive), the synchronized kick signal 304, and the next kick signals 502, 506 corresponding to outputs 0 and 2, respectively. When the synchronized kick signal 304 is a logical high value, the example time duration calculator 704 determines a time duration for which the output voltage is to be charged based on the next kick signals 502, 506. The example time duration calculator 704 calculates and outputs time duration signals (e.g., equivalent voltage signals) for three cases: 1) a time duration signal 714 for when there is no output voltage to be charged after output 1 (e.g., dead time); 2) a time duration signal 716 for cases in which output 0 is to be charged at the next resonator cycle; and 3) a time duration signal 718 for cases in which output 2 is to be charged at the next resonator cycle. The time duration signals 714-718 (e.g., voltages) may be calibrated based on the relative output voltages of the outputs 0, 1, and 2.

The example time duration calculator 706 calculates and outputs time duration signals 720, 722, 724 to control the resonator cycle durations when the output 2 is being charged, based on the next output to be charged. The time duration calculator 706 receives input signals including a measurement of the resonator voltage 176 (e.g., a resonator voltage measured when the zero current crossing signal 142 transitions from negative to positive), the synchronized kick signal 306, and the next kick signals 502, 504 corresponding to outputs 0 and 1, respectively. When the synchronized kick signal 306 is a logical high value, the example time duration calculator 706 determines a time duration for which the output voltage is to be charged based on the next kick signals 504, 506. The example time duration calculator 706 calculates and outputs time duration signals (e.g., equivalent voltage signals) for three cases: 1) a time duration signal 720 for when there is no output voltage to be charged after output 2 (e.g., dead time); 2) a time duration signal 722 for cases in which output 0 is to be charged at the next resonator cycle; and 3) a time duration signal 724 for cases in which output 1 is to be charged at the next resonator cycle. The time duration signals 720-722 (e.g., voltages) may be calibrated based on the relative output voltages of the outputs 0, 1, and 2.

The example output signals 708-724 are output to the switch controller 154. In some examples, the time slot controller 162 further includes a time duration signal selector that selects and outputs one of the signals 708-724 to the switch controller 154 based on the synchronized kick signals 302-306 and the next kick signals 502-506.

Figure 8A:
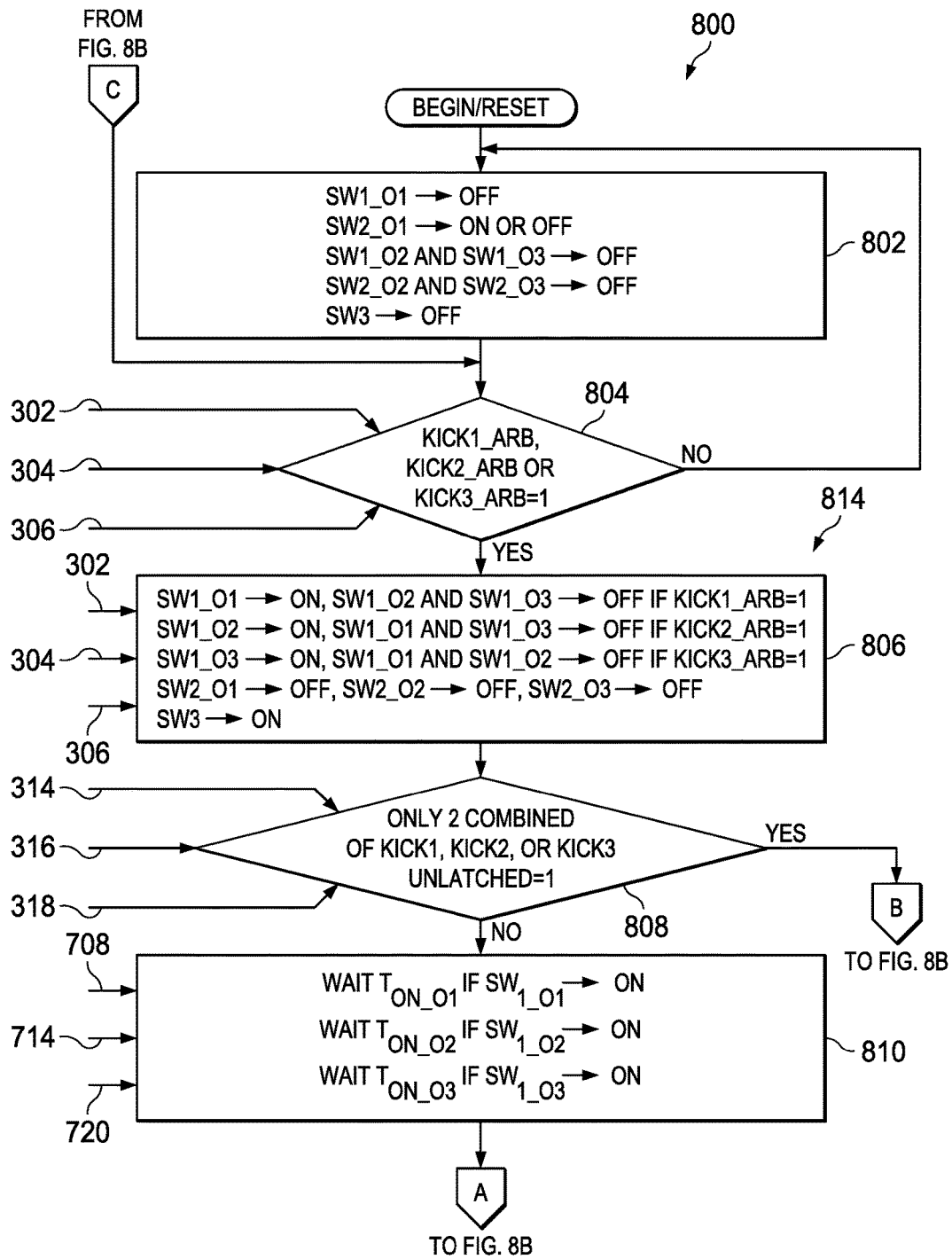
FIGS. 8A-8B show a flowchart of an example method to implement the switch controller of FIG. 1 to charge multiple output circuits having different priorities.
Figure 8B:
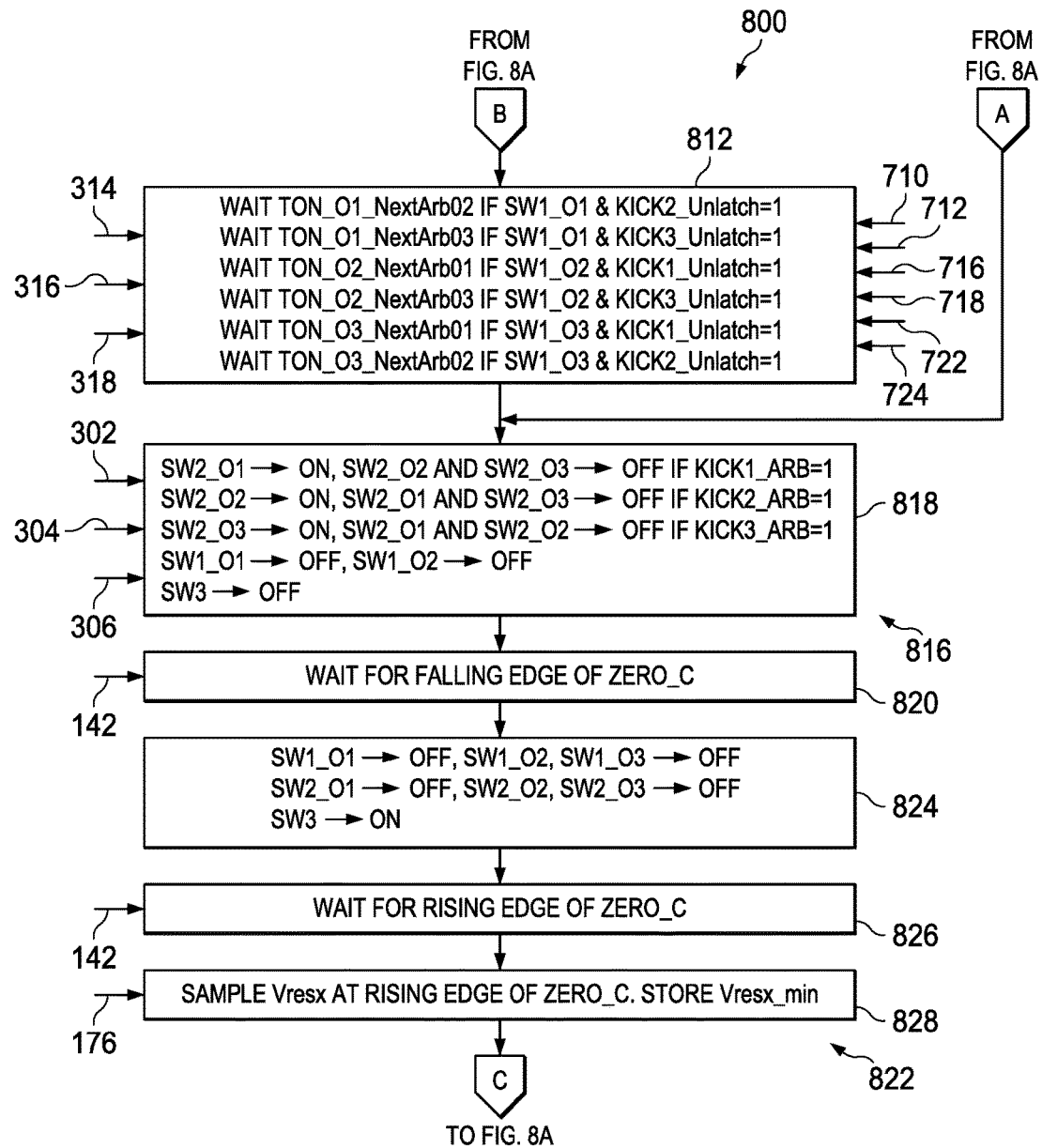

FIGS. 8A-8B show a flowchart of an example method 800 to implement the switch controller 154 of FIG. 1 to charge multiple output circuits having different priorities. The example method 800 of FIGS. 8A-8B may be implemented using logic circuits (e.g., application specific integrated circuits) and/or instructions executed on a general purpose integrated circuit. The example method 800 of FIGS. 8A-8B is shown for 3 output voltages. However, the example method 800 may be modified for fewer or more output voltages.

The notation used in FIGS. 8A-8B follows the SWX_OY pattern, where X refers to the load switches and Y refers to the output (e.g., O1 refers to output 1, O2 refers to output 2, O3 refers to output 3, etc.). Each of the output voltages has first and second switches (e.g., SW1 and SW2) to control the direction of energy to the corresponding output OY, and SW3 refers to the rectifier switch that is shared by all of the output voltages. For example, SW1_O1 refers to switch 1 of output voltage 1, SW2_O1 refers to switch 2 of output voltage 1, and SW1_O2 refers to switch 1 of output voltage 2.

The example method 800 of FIGS. 8A-8B begins by resetting the load switches 118 and the rectifier switch 116 to a dead time (e.g., non-charging) configuration (block 802). The example method 800 determines whether any of the synchronized kick signals 302, 304, 306 of FIG. 3 has been output as a logical high signal by the arbitration circuit 144 (block 804).

If none of the synchronized kick signals 302, 304, 306 is a logical high signal (block 804), control returns to block 802 to control the load switches 118 and the rectifier switch 116 to enter a dead time or non-charging mode.

When one of the synchronized kick signals 302, 304, 306 is output at a logical high (block 804), the example switch controller 154 controls the load switches 118 and the rectifier switch 116 to charge one of the output voltages based on the synchronized kick signals 302, 304, 306 (block 806). For example, the switch controller 154 begins charging the output (e.g., output 1) that corresponds to the synchronized kick signal that is a logical high signal (e.g., 302) by turning on SW1 (e.g., SW1_O1→ON) corresponding to that output, closing SW1 corresponding to the other outputs (e.g., SW1_O2 and SW1_O3), turning SW2 off for all of the outputs (e.g., SW2_O1, SW2_O2, and SW2_O3 all off), and turning SW3 on.

The example switch controller 154 determines whether two of the unsynchronized kick signals 314, 316, 318 are at logical high values (block 808). If there are not two of the unsynchronized kick signals 314, 316, 318 at logical high values (block 808) (e.g., either 1 or 3 of the unsynchronized kick signals is a logical high value), the example switch controller 154 waits (e.g., holds the load switches 118 and the rectifier switch 116 at their present values) for an amount of time that is based on the output being charged (block 810). For example, the switch controller 154 waits for $T_{ON\_O1}$ (e.g., $T_{ON\_O1}$ 708 of FIG. 7) when the output 1 is being charged (e.g., when SW1_O1 is on).

On the other hand, if two of the unsynchronized kick signals 314, 316, 318 are at logical high values (block 808), the example switch controller 154 waits for a time that is determined based on the output currently being charged and based on the output voltage to be charged in the next resonator cycle (block 812, FIG. 8B). The example charging time (e.g., wait time) used in block 810 or 812 is determined by the time slot controller 162 and/or the time duration calculators 702, 704, 706 of FIGS. 1 and 7. Blocks 806, 808, 810, and 812 collectively implement a first phase 814 of a resonator cycle (e.g., phase 1).

After waiting for a charging time of the current output (block 810 or block 812), the example switch controller 154 ends the first phase 814 and enters the second phase 816 (e.g., phase 2) by controlling the load switches 118 and the rectifier switch 116 based on the one of the synchronized kick signals 302, 304, 306 is at a logical high value (block 818). In the example in which the synchronized kick signal 302 is at a logical high value, the example switch controller 154 switches SW2_O1 on and switches SW2_O2 and SW2_O3 off.

The example switch controller 154 then waits (e.g., maintains the load switches 118 and the rectifier switch 116 in the same state) until a falling edge of the zero current crossing signal 142 (block 820). For example, the zero current crossing detector 136 changes the zero current crossing signal 142 from a logical high to a logical low (e.g., falling edge) when the current through the inductor 122 discharges during phase 2 and reverses polarity.

In response to detecting the falling edge of the zero current crossing signal 142, the example switch controller 154 ends the second phase 816 and enters a third phase 822 by turning SW1 and SW2 off for each of the outputs (e.g., turning SW1_O1, SW1_O2, and SW1_O3 off), and turning SW3 on (block 824). The example switch controller 154 holds the DC-DC converter 100 in the third phase 822 and waits for a rising edge of the zero current crossing signal 142 (block 826). When the rising edge of the zero current crossing signal 142 is detected, the example switch controller 154 samples and stores the resonant voltage 176. At the rising edge of the zero current crossing signal 142, the example resonant voltage 176 is approximately at a local minimum, which the example switch controller 154 measures and stores for subsequently determining the on time of the next resonator cycle.

The example switch controller 154 returns control to block 804 to determine whether any of the synchronized kick signals 302, 304, 306 of FIG. 3 has been output as a logical high signal by the arbitration circuit 144. Thus, the next resonator cycle may begin immediately or, if none of the synchronized kick signals 302, 304, 306 is logical high, the switch controller 154 may return the DC-DC converter 100 to a dead time mode.

Figure 9:
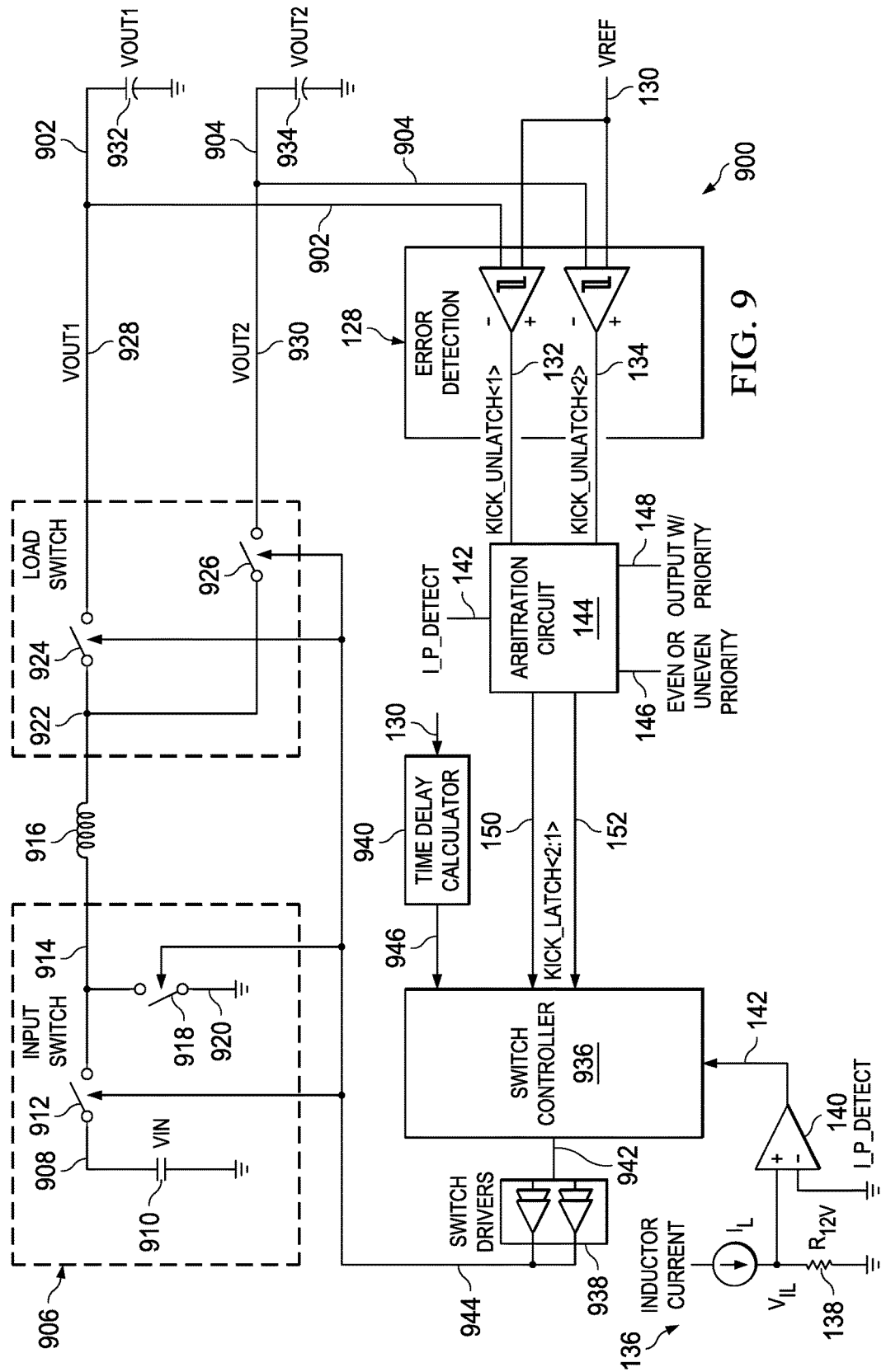
FIG. 9 is a schematic diagram of an example arbitrated-output classical single-input-multiple-output DC-DC converter to charge multiple output voltages having different priorities.

FIG. 9 is a schematic diagram of an example arbitrated-output classical single-input-multiple-output DC-DC converter 900 to charge multiple output voltages 902, 904 having different priorities. The example DC-DC converter 900 has a "classical" configuration, as opposed to the "resonant" configuration of the DC-DC converter 100 of FIG. 1.

The example DC-DC converter 900 of FIG. 9 includes an input switch circuit 906 that receives an input voltage 908 (e.g., the output of a battery 910). An input switch 912 is connected between the input voltage 908 and a conductor 914 which is connected to one terminal of an inductor 916 (e.g., an external power inductor). Also, an input switch 918 is connected between the conductor 914 and a reference voltage 920. The other terminal of inductor 916 is connected to a resonance conductor 922 that is connected to each of multiple output switches 924, 926. The terminals of the output switches 924, 926 are connected to respective output conductors 928, 930 to output the output voltages 902, 904 on one terminal of each of load capacitors 932, 934, respectively.

The example switch 924 is coupled between the resonance conductor 922 and the first output conductor 928 for the first output voltage 902. The switch 924 selectively conducts inductor current from the inductor 916 to the first output conductor 928. The example switch 926 is coupled between the resonance conductor 922 and the second output conductor 930 for the second output voltage 904. The switch 926 selectively conducts the inductor current from the inductor 916 to the second output conductor 930. The output conductors 928, 930 are connected to load capacitors 932, 934, respectively.

The example inductor 916 is coupled to the battery (e.g., a source of a DC input voltage) via the input switch 912 and is connected to the reference voltage 920 via the input switch 918. The example inductor 916 is also coupled to the resonance conductor 922 on its opposite terminal.

The example DC-DC converter 900 includes the example error detector 128, the example reference voltage 130, the example unsynchronized kick signals 132, 134, the example zero current crossing detector 136, the example comparator 138, the example resistor 140, the example zero current crossing signal 142, the example arbitration circuit 144, the example priority signals 146, 148, and the example synchronized kick signals 150, 152 of FIG. 1.

In the example of FIG. 9, the arbitration circuit 144 determines one of the first output voltage 902 or the second output voltage 904 to have priority over the other of the first output voltage 902 or the second output voltage 904 based on the priority signal(s) 146, 148. The example arbitration circuit 144 selects the determined one of the first output voltage 902 or the second output voltage 904 to be charged during a first number of time slots based on the priority signal(s) 146, 148. In the example of FIG. 9, the first number of time slots (corresponding to the output voltage having priority) is larger than a second number of time slots assigned to the output voltage that does not have priority.

The example DC-DC converter 900 further includes a switch controller 936, switch drivers 938, and a time delay calculator 940. The example switch controller 936 receives the synchronized kick signals 150, 152 and outputs a switch signal 942 to the switch drivers 938. The switch drivers 938 output switch control signals 944 to the input switches 912, 918 and the load switches 924, 926 to control charging the output voltages 902, 904.

The example switch controller 936 controls the charging time of the output voltages 902, 904 based on a time delay signal 946 determined by the time delay calculator 940. For example, the time delay calculator 940 converts a difference between an output voltage 902, 904 being charged and a target voltage (e.g., the reference voltage 130).

In the example of FIG. 9, the switch controller 936 controls the switches 912, 918, 924, 926 to charge the determined one of the first output voltage 902 or the second output voltage 904 during the first number of time slots and controls the switches 912, 918, 924, 926 to charge the other one of the first output voltage 902 or the second output voltage 904 during the second number of time slots (e.g., based on the synchronized kick signals 150, 152).

From the foregoing, it will appreciate that the above disclosed methods, apparatus and articles of manufacture reduces electromagnetic interference, reduces stress on the logic circuits, and increases power efficiency of the circuit. Furthermore, disclosed examples enable improved and/or customizable ripple performance for multiple output circuits using different types of SIMO topologies (e.g., resonator-based and/or classical-based).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A DC-DC voltage converter control circuit, comprising: a switch controller to control respective switches of a single-input-multiple-output DC-DC voltage converter having a plurality of output circuits; and an arbitration circuit to: determine a first one of the output circuits to have priority over other ones of the output circuits based on a priority signal; and select a first one of the at least two of the output circuits to be charged during a first time slot based on the priority signal and based on first kick signals indicating that the at least two output circuits are to be charged; a next kick detector to determine a second one of the output circuits to be charged during a second time slot after the first time slot based on the priority; and a time slot controller to determine a first time duration of the first time slot based on the determined second one of the output circuits, the arbitration circuit to output a second kick signal to the switch controller to control the switches to charge the first one of the output circuits during the first time slot, wherein the control circuit further including a resonator circuit, the switch controller to control the resonator circuit to store energy during a first phase and a third phase of a resonator cycle and to control the resonator circuit to discharge energy to the output circuits during a second phase of the resonator cycle, the switch controller to control the resonator circuit to repeat the resonator cycle to charge the output circuits during the first and second time slots.

2. The control circuit as defined in claim 1, further including an error detector to generate a first one of the first kick signals by comparing a first voltage output by the first one of the output circuits to a reference voltage and outputting the first one of the first kick signals when the first voltage traverses the reference voltage.

3. The control circuit as defined in claim 1, further including: a zero current crossing detector to generate a clock signal based on a resonator current; and a clock divider to generate the first time slot and the second time slot based on the clock signal.

4. The control circuit as defined in claim 1, in which the time slot controller controls the first time slot to be longer than the second time slot based on the first kick signals.

5. The control circuit as defined in claim 1, in which the switch controller is to connect the first one of the output circuits to the resonator circuit during the first time slot and to connect the second one of the output circuits to the resonator circuit during the second time slot, the first time slot including the first phase of the resonator cycle and the second time slot including the second phase of the resonator cycle.

6. The control circuit as defined in claim 1, in which the switch controller is to connect the first one of the output circuits to the resonator circuit during the first time slot and to connect the second one of the output circuits to the resonator circuit during the second time slot, the first time slot including the first phase, the second phase, and the third phase of a first resonator cycle and the second time slot including the first phase, the second phase, and the third phase of a second resonator cycle.

7. The control circuit as defined in claim 1, in which the next kick detector is to determine the second one of the output circuits to be charged during the second time slot by: detecting a number of the output circuits that are to be charged based on the first kick signals; and when two of the output circuits are to be charged during the first time slot and the second time slot based on the first kick signals, select the second one of the output circuits to
be charged during the second time slot based on the first one of the output circuits being charged during the first time slot; or when more than two of the output circuits are to be charged during the first time slot and the second time slot based on the first kick signals, selecting the second one of the output circuits based on a configured charging order of the output circuits.

8. The control circuit as defined in claim 7, in which the time slot controller is to set the first time duration of the first slot based on the first one of the output circuits being charged during the first time slot and based on the second one of the output circuits being charged during the second time slot.

9. The control circuit as defined in claim 8, in which the time slot controller is to set the first time duration to achieve zero voltage switching between first and second phases of a resonator while charging the first one of the output circuits.

10. The control circuit as defined in claim 9, in which zero voltage switching includes a voltage difference across a resonator capacitor of less than 100 millivolts.

11. A DC-DC voltage converter, comprising:
an inductor having a first terminal directly coupled to a source of a DC input voltage and a second terminal coupled to a resonance conductor;
a resonance capacitor having a first terminal coupled to the resonance conductor;
a first switch coupled between the resonance conductor and a first output conductor for a first output voltage, the first switch to selectively conduct inductor current to the first output conductor during a first resonator phase of a first resonator cycle;
a second switch coupled between a second terminal of the resonance capacitor and the first output conductor, the second switch to selectively conduct the inductor current through the resonance capacitor into the first output conductor during a second resonator phase of the first resonator cycle;
a third switch coupled between the resonance conductor and a second output conductor for a second output voltage, the third switch to selectively conduct the inductor current to the second output conductor during the first resonator phase of a second resonator cycle;
a fourth switch coupled between the second terminal of the resonance capacitor and the second output conductor, the fourth switch to selectively conduct the inductor current through the resonance capacitor into the first output conductor during a second resonator phase of the second resonator cycle;
a fifth switch coupled between the second terminal of the resonance capacitor and a first reference voltage for conducting the inductor current from a source of the first reference voltage through the resonance capacitor into the source of the DC input voltage during a third phase of the first resonator cycle and a third phase of the second resonator cycle;
a switch controller coupled to the first, second, third, fourth, and fifth switches to control the first, second, third, fourth, and fifth switches;
an arbitration circuit coupled to the switch controller, the arbitration circuit to:
determine a first one of the output voltages to have priority over other ones of the output voltages based on a priority signal; and
select a first one of the at least two of the output voltages to be charged during a first time slot based on the priority signal and based on first kick signals indicating that the at least two output voltages are to be charged;
a next kick detector coupled to the arbitration circuit to determine a second one of the output voltages to be charged during a second time slot after the first time slot based on the priority; and
a time slot controller coupled to the next kick detector, the arbitration circuit, and the switch controller, the time slot controller to determine a first time duration of the first time slot based on the determined second one of the output voltages, the arbitration circuit to output a second kick signal to the switch controller to control the first, second, and fifth switches to charge the first one of the output voltages during the first time slot.

12. The DC-DC voltage converter as defined in claim 11, further including an error detector to generate a first one of the first kick signals by comparing a first voltage output by the first output conductor to a reference voltage and outputting the first one of the first kick signals when the first voltage traverses the reference voltage.

13. The DC-DC voltage converter as defined in claim 11, further including: a zero current crossing detector to generate a clock signal based on a resonator current; and a clock divider to generate the first time slot and the second time slot based on the clock signal.

14. The DC-DC voltage converter as defined in claim 11, in which the switch controller is to control the first switch to connect the first output conductor to the resonance conductor during the first time slot and to control the fourth switch to conduct the inductor current through the resonance capacitor into the first output conductor during the second time slot, the first time slot including the first phase of a third resonator cycle and the second time slot including the second phase of the third resonator cycle.

15. The DC-DC voltage converter as defined in claim 11, in which the switch controller is to control the first, second, and fifth switches to charge the first output voltage during the first time slot, and is to control the third, fourth, and fifth switches to charge the second output voltage during the second time slot, the first time slot including the first phase, the second phase, and the third phase of the first resonator cycle and the second time slot including the first phase, the second phase, and the third phase of the second resonator cycle.

16. The DC-DC voltage converter as defined in claim 11, in which the next kick detector is to determine the second one of the output voltages to be charged during the second time slot by: detecting a number of the output voltages that are to be charged based on the first kick signals; and when two of the output voltages are to be charged during the first time slot and the second time slot based on the first kick signals, select the second one of the output voltages to be charged during the second time slot based on the first one of the output voltages being charged during the first time slot; or when more than two of the output voltages are to be charged during the first time slot and the second time slot based on the first kick signals, selecting the second output voltage based on a configured charging order of the output voltages.

17. The DC-DC voltage converter as defined in claim 16, in which the time slot controller is to set a first time duration of the first time slot based on the first output voltage being charged during the first time slot and based on the second output voltage being charged during the second time slot.

18. The DC-DC voltage converter as defined in claim 17, in which the time slot controller is to set the first time duration to achieve zero voltage switching between first and second phases of a resonator while charging the first output voltage.

19. A DC-DC voltage converter, comprising:
an inductor having a first terminal coupled to a source of a DC input voltage via a first switch and connected to a first reference voltage via a second switch, and having a second terminal coupled to a resonance conductor;
a third switch coupled between the resonance conductor and a first output conductor for a first output voltage, the third switch to selectively conduct an inductor current to the first output conductor;
a fourth switch coupled between the resonance conductor and a second output conductor for a second output voltage, the fourth switch to selectively conduct the inductor current to the second output conductor;
an arbitration circuit to:
determine one of the first output voltage or the second output voltage to have priority over the other of the first output voltage or the second output voltage based on a priority signal; and
select the determined one of the first output voltage or the second output voltage to be charged during a first number of time slots based on the priority signal, the first number of time slots being larger than a second number of time slots assigned to the other one of the first output voltage or the second output voltage; and
a switch controller to control the first, second, third, and fourth switches to charge the determined one of the first output voltage or the second output voltage during the first number of time slots and to charge the other one of the first output voltage or the second output voltage during the second number of time slots.

* * * * *